US011402983B2

(12) United States Patent
Barthel (10) Patent No.: US 11,402,983 B2
(45) Date of Patent: Aug. 2, 2022

(54) DISPLAY FOR AN ELECTRONIC MEASUREMENT DEVICE AND METHOD TO CHANGE A NUMERICAL VALUE OF AN ELECTRONIC MEASUREMENT DEVICE

(71) Applicant: Rohde & Schwarz GmbH & Co. KG, Munich (DE)

(72) Inventor: Sven Barthel, Chemnitz (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 0 days.

(21) Appl. No.: 16/876,827

(22) Filed: May 18, 2020

(65) Prior Publication Data

US 2021/0149550 A1    May 20, 2021

(30) Foreign Application Priority Data

Nov. 15, 2019  (EP) .................................... 19209358

(51) Int. Cl.
| *G06F 3/04847* | (2022.01) |
| *G06F 3/04815* | (2022.01) |
| *G06F 3/04855* | (2022.01) |
| *G06F 3/04886* | (2022.01) |
| *G09G 3/20* | (2006.01) |

(52) U.S. Cl.
CPC ...... *G06F 3/04847* (2013.01); *G06F 3/04815* (2013.01); *G06F 3/04855* (2013.01); *G06F 3/04886* (2013.01); *G09G 3/20* (2013.01); *G09G 2340/0407* (2013.01); *G09G 2354/00* (2013.01)

(58) Field of Classification Search
CPC ............. G06F 3/04847; G06F 3/04886; G06F 3/04815; G06F 3/04855
See application file for complete search history.

(56) References Cited

U.S. PATENT DOCUMENTS

| 5,289,205 A | 2/1994 | Torres |
| 2002/0063737 A1 | 5/2002 | Feig et al. |
| 2003/0117380 A1* | 6/2003 | Kanzaki ............... G06F 3/04847 345/173 |
| 2007/0146325 A1* | 6/2007 | Poston .................. G06F 3/0317 345/163 |
| 2010/0134425 A1* | 6/2010 | Storrusten ............. G06F 3/0482 345/173 |
| 2015/0012857 A1 | 1/2015 | Tang |
| 2015/0058801 A1 | 2/2015 | John et al. |
| 2015/0328516 A1* | 11/2015 | Coza .................. A63B 24/0062 473/446 |

FOREIGN PATENT DOCUMENTS

GB    2307383 A    5/1997

* cited by examiner

*Primary Examiner* — Nelson M Rosario
*Assistant Examiner* — Scott D Au
(74) *Attorney, Agent, or Firm* — Ditthavong, Steiner & Mlotkowski (57) ABSTRACT

The invention relates to a display for an electronic measurement device, wherein the display is configured to display a graphical user interface, wherein the display is configured to detect a first and a second user input on the graphical user interface, wherein the display is configured to determine a change of a numeric value of the electronic measurement device based on the first user input, and wherein the display is configured to determine a resolution and/or a value range for the change of the numerical value based on the second user input.

15 Claims, 8 Drawing Sheets

DISPLAY FOR AN ELECTRONIC MEASUREMENT DEVICE AND METHOD TO CHANGE A NUMERICAL VALUE OF AN ELECTRONIC MEASUREMENT DEVICE

PRIORITY

This application claims priority of the European patent application EP 19 209 358.1 filed on Nov. 15, 2019, which is incorporated by reference herewith.

TECHNICAL FIELD OF THE INVENTION

The invention relates to a display for an electronic measurement device and an electronic measurement device comprising said display. The invention further relates to a method for changing a numerical value of an electronic measurement device.

BACKGROUND OF THE INVENTION

Instruments, such as oscilloscopes or spectrum analyzers, often require inputting specific numerical values, e.g. a specific frequency, to select an instrument setting or function. There are various solutions for inputting such numerical values to the instrument.

A keyboard, e.g. a touch keyboard on an instrument display, allows directly inputting a numerical value. However, approaching a target value step by step, e.g. to find an optimum value, can be cumbersome with a keyboard, as each new value hast to entered fully.

A rotary knob allows an incremental or decremental change of a numerical value. However, the increment respectively decrement of a rotary knob is fixed and can be either too coarse or too fine for a certain working range. A possibility to switch between a coarse and a fine setting is not advantageous since it would require additional user inputs.

US 2015/0012857 A1, for instance, discloses a method for operation a virtual adjusting button, which can be a rotary knob. Thereby, a displaying size of the virtual button can be changed in order to change the precision of adjusting a value with the button. However, the precision can only be set indirectly via the size of the adjusting button and the available range of the button cannot be changed as easily.

In contrast to a rotary button, a slider, such as a scrollbar, allows to quickly set a rough approximation of a target value between two limit values. However, such a slider may lack a necessary precision to change a numerical value by a small factor or to set a target value.

US 2002/0063737 A1 discloses a graphical user interface method, where a coarse control scrollbar and a magnified view scrollbar with a finer resolution are displayed proximate to each other The magnified view scrollbar can be used for fine adjustment of a value. However, setting a value may require separate inputs on both scrollbars for a course and subsequently a fine adjustment. In addition, the magnification range of the magnified view scrollbar is preset by the user and might be too coarse or too fine for certain situations.

US 2015/0058801 A1 discloses a system for providing a multi-touch inspection tool for a chart. The inspection tool is displayed on a multi-touch display, wherein a course adjustment of the scaling of the chart can be performed via a multiplier-scale control and a fine adjustment of the scaling can be performed via a separate precision control. However, this system also requires separate inputs on the two control units for a course and subsequently a fine adjustment. Further, the user cannot change a value range of the controls dynamically.

Thus, it is a need to provide an improved display for an electronic measurement device, an improved electronic measurement device and an improved method for changing a numeric value of an electronic measurement device, which avoid the above limitations. In particular, it is an objective to provide a concept for setting and/or changing numerical values of electronic measurement devices that offers a selectable range of settable values and simultaneously provides a high precision for setting respectively changing each value.

SUMMARY OF THE INVENTION

According to a first aspect, the invention refers to a display for an electronic measurement device, wherein the display is configured to display a graphical user interface, wherein the display is configured to detect a first and a second user input on the graphical user interface, wherein the display is configured to determine a change of a numeric value of the electronic measurement device based on the first user input, and wherein the display is configured to determine a resolution and/or a value range for the change of the numerical value based on the second user input. This achieves the advantage that a numeric value of an electronic measurement device can be changed in a precise and efficient way.

The display can be arranged on the electronic measurement device.

The display can comprise a display segment embedded in a housing or a frame member, wherein the graphical user interface is displayed in the display segment.

The display can comprise a touch-sensitive display, wherein the user, for instance, makes an input via a finger or a stylus.

Alternatively, the user input can be made with a cursor, e.g. a mouse cursor.

The numeric value can define a state and/or a setting of the electronic measuring device. Changing the numerical value can refer to changing the state or the setting of the electronic measuring device from an initial state or setting to a new state or setting. Changing the numerical value comprises setting the new numerical value.

Preferably, the resolution for the change of the numerical value represents an incrementation respectively a decrementation when increasing respectively decreasing the numerical value. The resolution can refer to a precision for changing the numerical value.

The value range for the change of the numerical value can represent a currently available range from a minimum numerical value to a maximum numerical value within which the numerical value can be changed.

For instance, if the numerical value is a frequency, e.g. the center frequency of a spectrum, the user can set a maximum value range of 0 to 1 GHz and a maximum resolution of 1 Hz. The user can decrease the resolution to change the frequency quickly over the maximum value range in coarse steps, and/or the user can decrease the value range to set a specific target frequency within the decreased value range with high resolution.

Preferably, determining the resolution and/or value range can refers to detecting a resolution and/or value range based on the second user input and setting said resolution and/or value range for the first user input.

The graphical user interface can comprise a scale or a scrollbar. The value range can be a range that is displayed on the scale or scrollbar or that is adjustable via the scale or scrollbar. The resolution can refer to a resolution of the scale or scrollbar, in particular an incrementation of the scale or scrollbar.

The display can comprise a processing unit or can be connectable to a processing unit of the electronic measurement device.

The processing unit can be configured to determine the change of a numeric value of the electronic measurement device based on the first user input and/or to determine the resolution and/or the value range for the change of the numerical value based on the second user input.

The processing unit can further be configured to adjust a setting or function of the electronic measurement device based on the change of the numeric value.

In an embodiment, the display is configured to display the resolution and/or value range for changing the numerical value in the graphical user interface. This achieves the advantage that the numerical value can be changed efficiently with a known resolution and/or within a known value range.

Preferably, the display is configured to display further selectable resolutions and/or value ranges besides the determined resolution and/or value range.

In an embodiment, after changing the numerical value, the display is configured to store the set numerical value in a list. This achieves the advantage that the electronic measurement device can be reset to a previously set numerical value.

The display can comprise a memory or can be connectable to a memory of the electronic measurement device for storing the list.

In an embodiment, the display is configured to display an indicator of the stored numerical value on the value range. This achieves the advantage that the electronic measurement device can be reset to a previously set numerical value.

The indicator can be an arrow or a marker on a scale or scrollbar.

In an embodiment, the value range is a non-linear range, in particular a logarithmic range. This provides the advantage, that the numerical value can be changed over a large value range.

In an embodiment, the display is configured to display a currently set numerical value of the electronic measurement device, wherein a number of digits of the displayed numerical value depends on the determined resolution. This achieves the advantage that a current setting of the electronic measurement device is displayed efficiently.

In an embodiment, the first and/or the second user input comprise a swipe and/or a zoom gesture. This achieve the advantage that the user input can be made efficiently.

In an embodiment, the graphical user interface comprises a 3D or quasi 3D control element, in particular a ball or a wheel.

In an embodiment, the graphical user interface comprises a first scale of selectable numerical values along a first axis, and a second scale of selectable resolutions for the first scale. This achieves the advantage that the graphical user interface can be used for coarse and fine adjustment of the numerical value.

Preferably, the first axis and the second axis are perpendicular. The first axis can be a horizontal axis and the second axis can be a vertical axis, or vice versa.

A currently set numerical value can be displayed in an intersection of the first and the second axis.

According to a second aspect, the invention relates to an electronic measurement device, comprising the display of the first aspect of the invention. This achieves the advantage that a numeric value of an electronic measurement device can be changed in a precise and efficient way.

The numeric value can define a state and/or a setting of the electronic measuring device.

In an embodiment, the electronic measurement device is any one of the following devices: an audio analyzer, an oscilloscope, a network analyzer, a power meter and/or volt meter, a receiver, a meter and/or counter, a signal and/or spectrum analyzer, a test and/or measurement device for broadcasting, a signal generator, a spectrum monitoring device, a wireless communications tester.

According to a third aspect, the invention relates to a method for changing a numerical value of an electronic measurement device, comprising the steps of: displaying a graphical user interface, detecting a first and a second user input on the graphical user interface, determining a change of a numeric value of the electronic measurement device based on the first user input, and determining a resolution and/or a value range for the change of the numerical value based on the second user input. This achieves the advantage that a numeric value of an electronic measurement device can be changed in a precise and efficient way.

In an embodiment, the determined resolution and/or value range for changing the numerical value is displayed in the graphical user interface. This achieves the advantage that the value can be changed efficiently with a known resolution and/or within a known value range.

In an embodiment, the method comprises the further steps of: after changing the numerical value, storing the set numerical value in a list, and displaying an indicator of the stored numerical value on the value range. This achieves the advantage that the electronic measurement device can be reset to a previously set numerical value.

In an embodiment, the value range is a non-linear range, in particular a logarithmic range. This provides the advantage, that the numerical value can be changed over a large value range.

In an embodiment, a currently set numerical value of the electronic measurement device is displayed in the graphical user interface, wherein a number of digits of the displayed numerical value depends on the determined resolution. This achieves the advantage that a current setting of the electronic measurement device is displayed efficiently.

In an embodiment, the first and/or the second user input comprise a swipe and/or a zoom gesture. This achieve the advantage that the user input can be made efficiently.

In an embodiment, the graphical user interface comprises a 3D or quasi 3D control element, in particular a ball or a wheel.

A computer program product can comprise program code for performing the steps of the above described method, when the computer program product runs on a computer or a digital signal processor.

BRIEF DESCRIPTION OF THE DRAWINGS

The invention will be explained in the followings together with the figures.

DETAILED DESCRIPTION OF THE PREFERRED EMBODIMENTS

Figure 1:
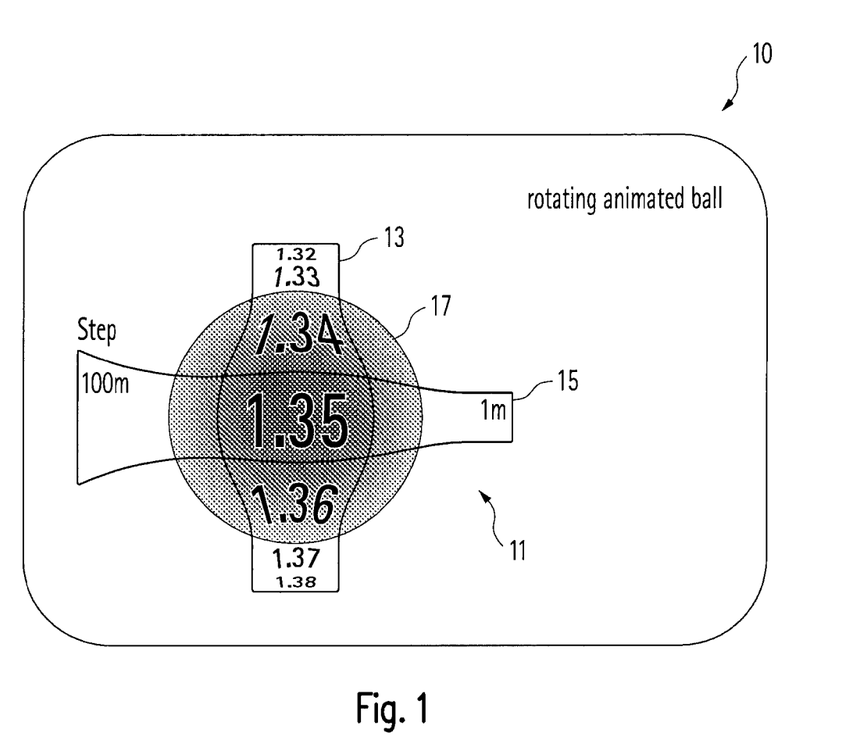
FIG. 1 shows a schematic diagram of a display for an electronic measurement device according to an embodiment.

FIG. 1 shows a schematic diagram of a display 10 for an electronic measurement device according to an embodiment.

The display 10 is configured to display a graphical user interface 11, and to detect a first and a second user input on the graphical user interface 11. The display 10 is further configured to determine a change of a numeric value of the electronic measurement device based on the first user input, and to determine a resolution and/or a value range for the change of the numerical value based on the second user input.

The display 10 can be a display of the electronic measurement device and can be arranged on the electronic measurement device.

The display 10 can comprise a display segment embedded in a housing or a frame member, wherein the graphical user interface is displayed in the display segment.

The display 10 can comprise a touch-sensitive display, wherein the user, for instance, makes an input via a finger or a stylus.

Alternatively, the user input can be made with a cursor, e.g. a mouse cursor.

The graphical user interface 11 can comprise a 3D or quasi 3D control element. The control element can be a graphical object or a control metaphor.

The graphical user interface 11 in FIG. 1 comprises an animated ball 17, a first (vertical) scale 13 and a second (horizontal) scale 15 that are wrapped around the ball 17.

In FIG. 1, the vertical scale 13 comprises selectable numerical values, while the horizontal scale 15 comprises selectable resolutions of the vertical scale 13. A currently selected numerical value is displayed in the center of the ball 17 in FIG. 1.

In particular, the horizontal scale 15 shows values which are multipliers for the vertical scale 13. The values on the horizontal scale 15 can comprise a unit, e.g. meters (m) or Hertz (Hz), which corresponds to the unit of the numerical value of the electronic measurement device.

In FIG. 1 the unit is meters and the selectable orders of magnitudes that are displayed on the horizontal scale 15 are 100 m, 10 m and 1 m, whereas 10 m is currently selected. The incrementation of the vertical scale 13 corresponds to the values of the vertical scale 13 multiplied by the selected value of the horizontal scale 15. The currently selected value in FIG. 1 is 1.35×10 m.

The first user input can be a vertical swiping movement over the ball 17, and the second user input can be a horizontal swiping movement over the ball 17. The ball 17 can be animated to rotate in response to the user inputs. The scales 13, 15 can be animated to rotate with the ball 17.

Thus, the graphical user interface 11 can comprise a relatively small graphical object for manipulation, which is easily readable, intuitive to operate, and does not take much space on the display 10 screen.

Figure 2A:
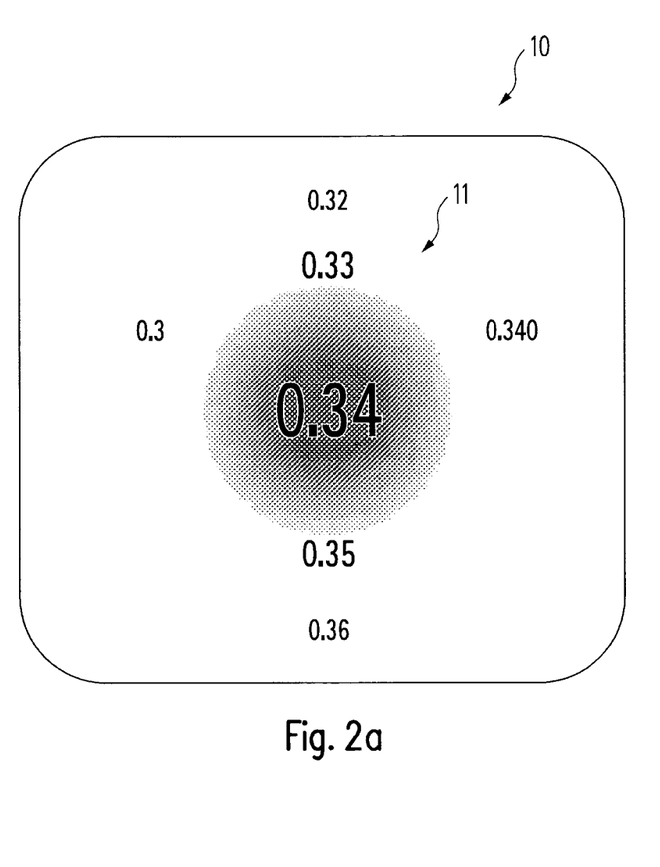
FIG. 2a-b show schematic diagrams of displays for an electronic measurement device according to an embodiment.
Figure 2B:
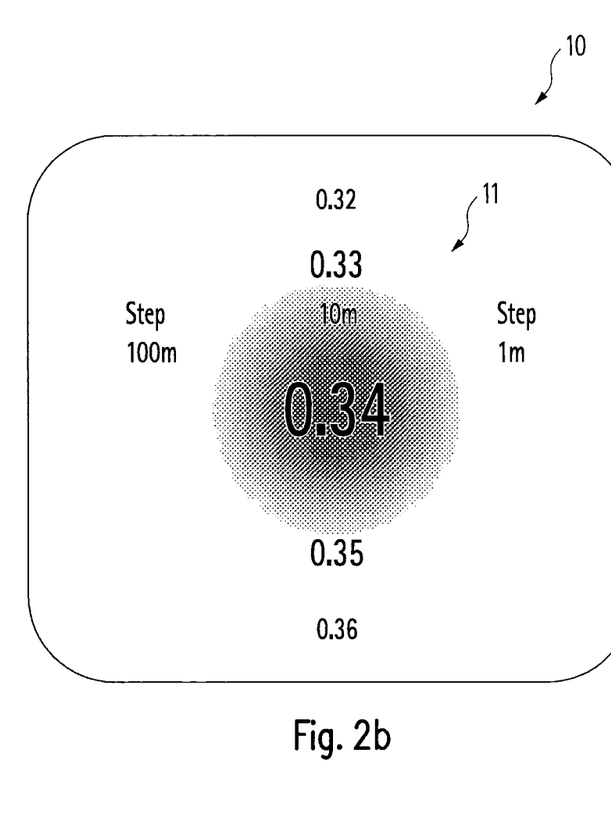

FIGS. 2a and 2b show schematic diagrams of displays 10 for the electronic measurement device according to further embodiments.

In FIG. 2a the graphical user interface 11 comprises selectable numerical values along a first (vertical) axis and selectable resolutions along a second (horizontal) axis. The numerical values and selectable ranges are animated as floating objects in a 3-dimensional surrounding. A currently selected numerical value floats before a gray background in the center.

By horizontally swiping over the display, the user can change the resolution of the vertical axis. In FIG. 2a, the resolution is represented by decimal places. Currently, two decimal places are selected and the incrementation of the vertical axis is 0.01.

In FIG. 2b the selectable resolution is displayed via a multiplier in the graphical user interface 11, similar to FIG. 1.

Figure 3:
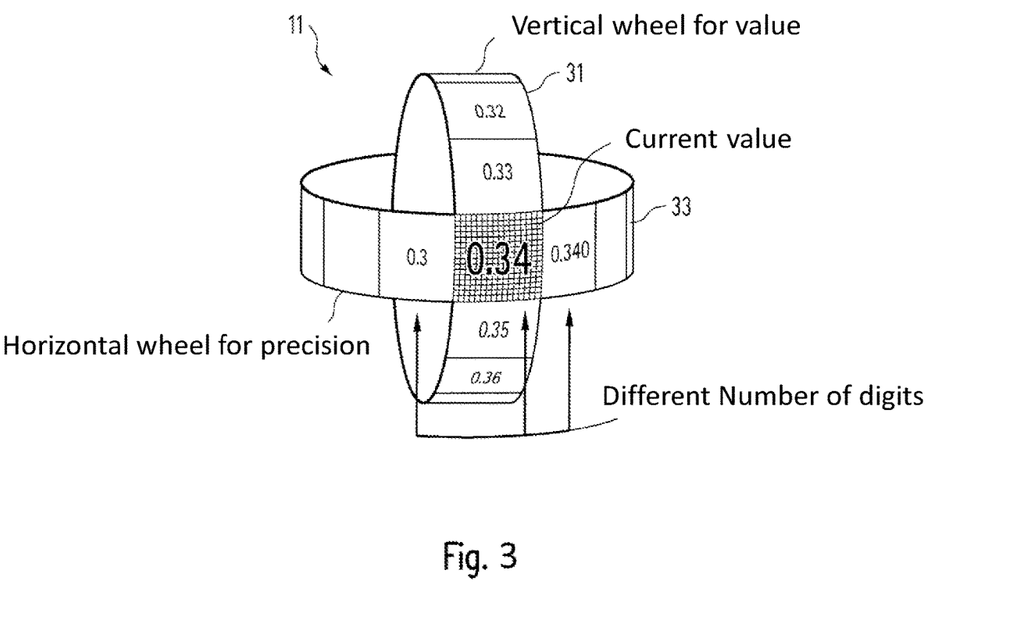
FIG. 3 shows a schematic diagram of a graphical user interface according to an embodiment.

FIG. 3 shows a schematic diagram of the graphical user interface 11 according to an embodiment.

The graphical user interface 11 in FIG. 3 comprises two animated 3-dimensional wheels 31, 33, which are wrapped around each other. A currently selected numerical value is displayed at the intersection of both wheels 31, 33.

In FIG. 3, a vertical wheel 31 shows a scale of selectable numerical values, while a horizontal wheel 31 shows selectable resolutions of the numerical values. Similar to FIG. 2a, the user can select the decimal places of the values on the vertical wheel 31 via the horizontal wheel 33.

The user can swipe horizontally over the graphical user interface 11 to select the precision of the numerical values and vertically to select the numerical value. The wheels 31, 33 can be animated to rotate in response to the user input.

Figure 4:
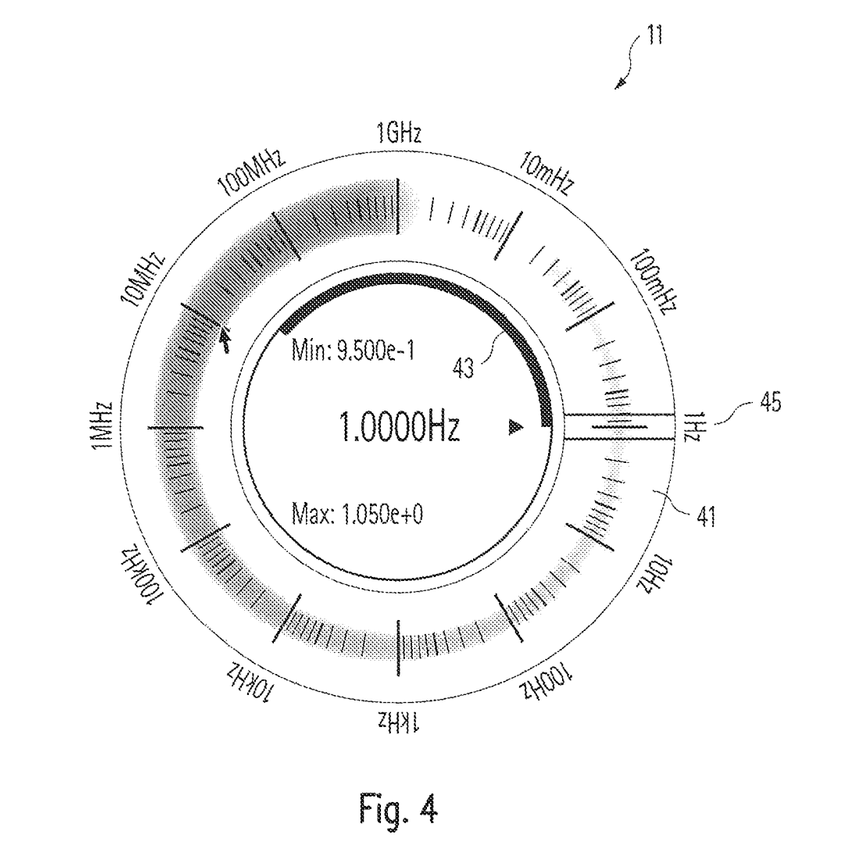
FIG. 4 shows a schematic diagram of a graphical user interface according to an embodiment.

FIG. 4 shows a schematic diagram of the graphical user interface 11 according to a further embodiment. The graphical user interface 11 in FIG. 4 can be used for selecting frequencies of the electronic measurement device.

The graphical user interface 11 in FIG. 4 comprises two animated rotary wheels 41, 43, each showing a value range. The wheels comprise an outer wheel 41 for a course adjustment of the numerical value and an inner wheel 43 for a fine adjustment. The outer wheel 41 in FIG. 4 comprises a horn shaped shading and a scale.

The outer wheel 41 in FIG. 4 comprises a segment marking 45. The segment marking 45 can mark a frequency range of the inner wheel 43 and/or can give a rough estimate of the currently selected numerical value. The currently selected value can further be displayed in the center of the inner wheel 43.

The outer wheel in FIG. 4 has a logarithmic scale from 10 mHz to 1 GHz. This allows to course adjust the selected value over a large range. The inner wheel 43 can have a linear scale for fine adjustment roughly within the frequency range of the segment marking 43.

The user input can be a tap or click on the outer wheel 41 and/or a dragging movement over the inner wheel 43. In particular, the user input on the inner wheel 43 corresponds to the first user input for selecting the value, and the user input on the outer wheel 41 corresponds to the second user input for selecting the value range of the inner wheel 43.

The display 10 can be configured to store the set numerical value in a list and to display an indicator of the stored numerical value on the value range, e.g. as a mark or arrow on the outer wheel 41.

The display 10 can comprise a memory or can be connectable to a memory of the electronic measurement device for storing the list.

Figure 5A:
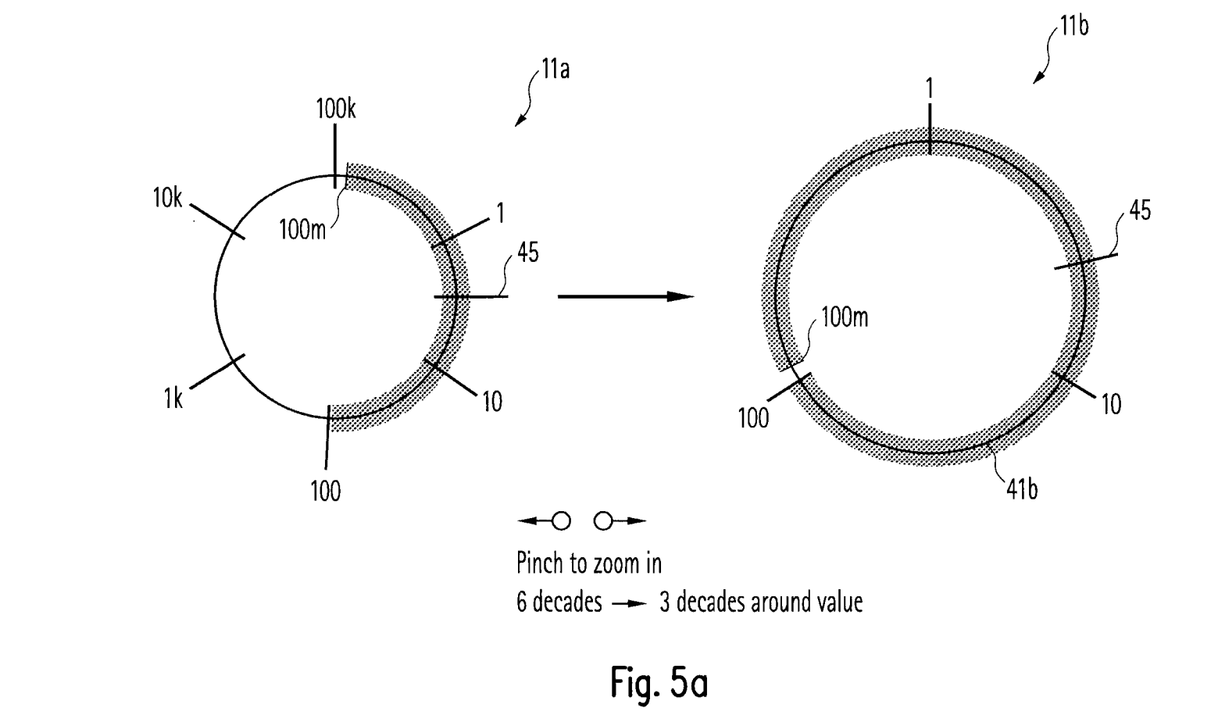
FIG. 5a shows a schematic diagram of a graphical user interface in two different zoom levels according to an embodiment.

FIG. 5a shows a schematic diagram of the graphical user interface 11a, 11b in two different zoom levels according to an embodiment. The graphical user interface 11a, 11b in FIG. 5a can correspond to the graphical user interface 11 of FIG. 4.

The graphical user interface 11a on the left of FIG. 5a is zoomed out and comprises an animated wheel 41a with a frequency range over six orders of magnitude. This graphical user interface 11a can be magnified by a zooming input, e.g. a "pinch to zoom" gesture by two fingers. In particular, the zooming input corresponds to the second user input.

The graphical user interface 11b on the right of FIG. 5a corresponds to a magnification of the user interface 11a on the left. The animated wheel 41b of the magnified user interface 11b has an increase resolution and a decreased value range over three orders of magnitude, as compared to the zoomed out wheel 41a.

Thus, by changing the magnification of the graphical user interface 11a, 11b, the resolution and/or value range for selecting the numerical value can be changed.

Figure 5B:
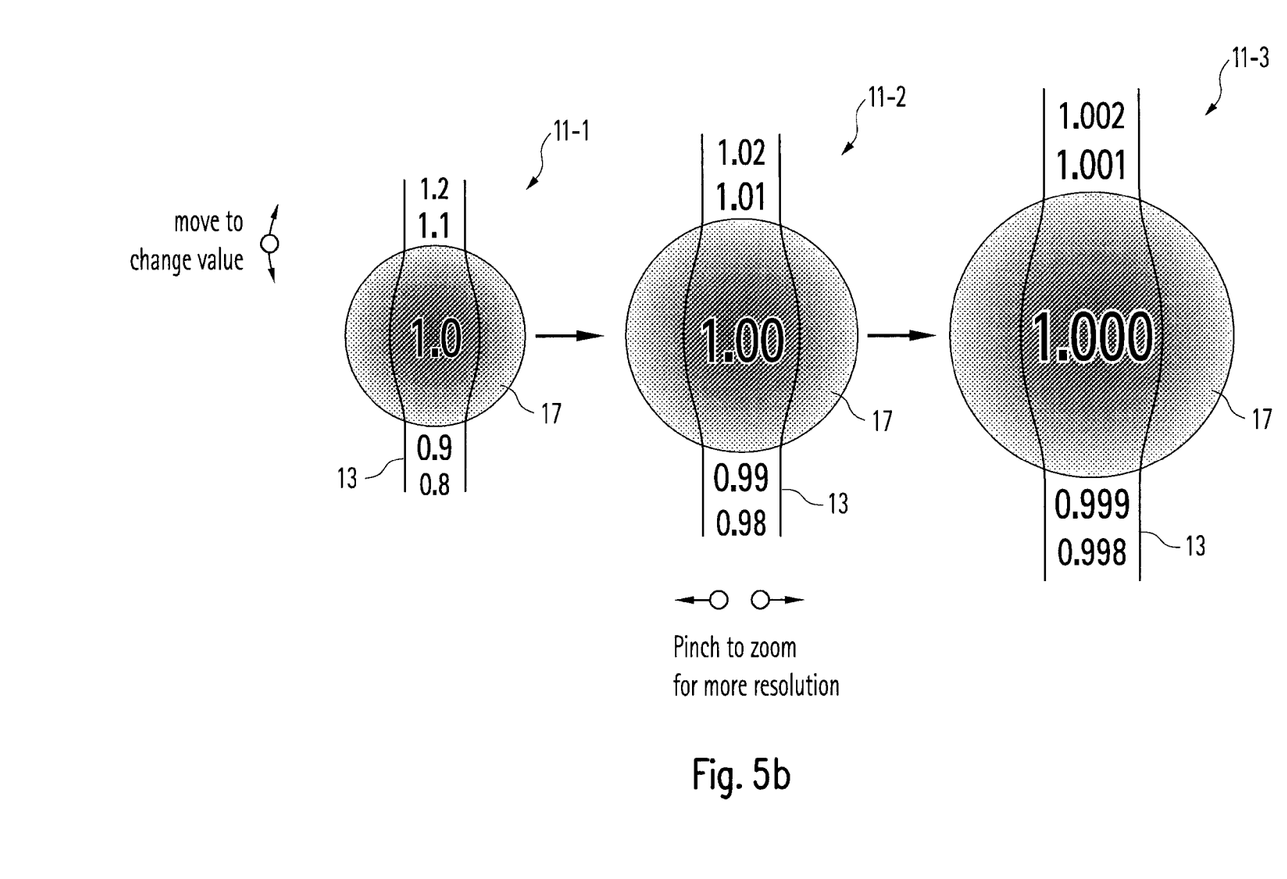
FIG. 5b shows a schematic diagram of a graphical user interface in three different zoom levels according to an embodiment.

FIG. 5b shows a schematic diagram of the graphical user interface 11-1, 11-2, 11-3 in three different zoom levels according to an embodiment.

The graphical user interface 11-1, 11-2, 11-3 comprises an animated ball 17 and a vertical scale 13 that displays a value range of selectable numerical values. A currently selected numerical value is displayed in the center of the ball 17.

The resolution of the value range is correlated to the size of the ball. Via a zooming input, the user can increase the size of the ball 17. When the size of the ball reaches a threshold the resolution of the value range is increased by one decimal place. Via vertical swipe gesture over the scale 13, the user can then select a numerical value.

Figure 6:
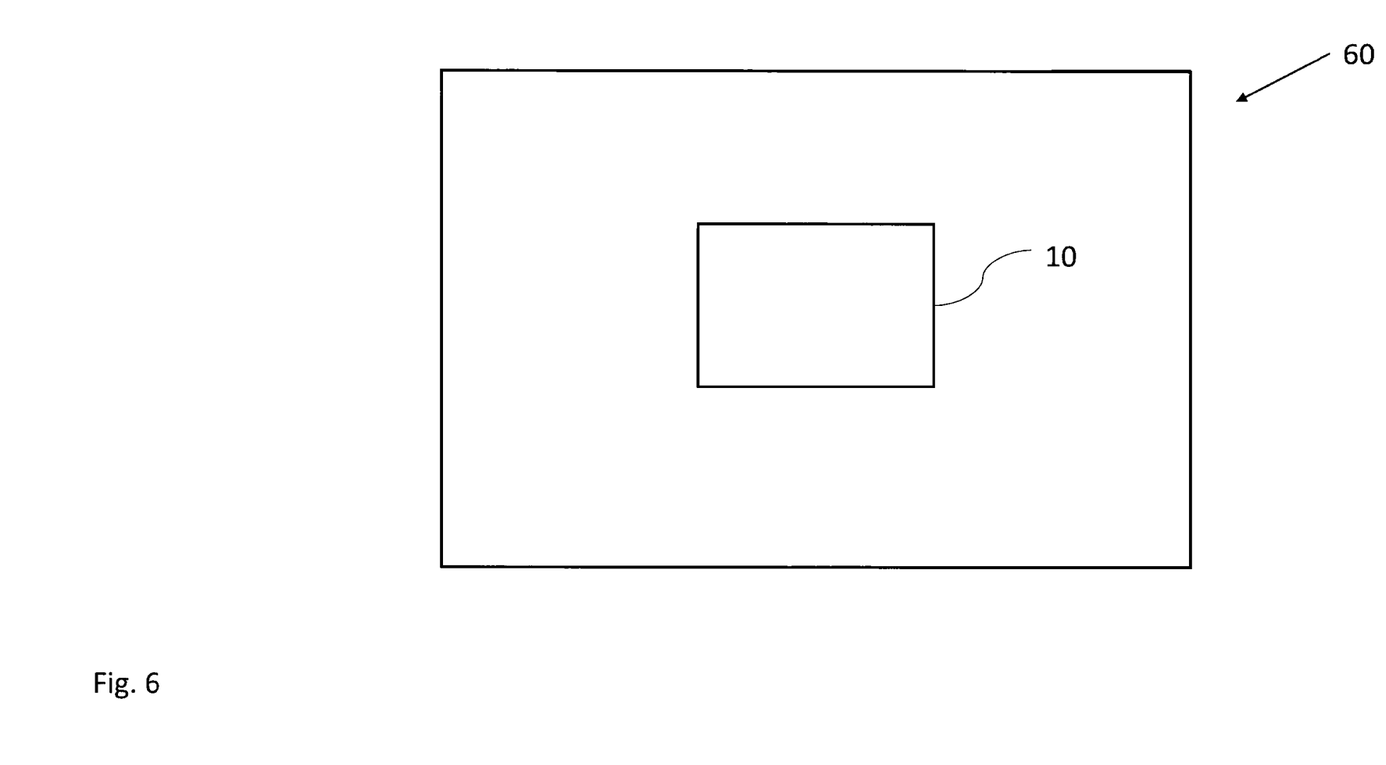
FIG. 6 shows a schematic diagram of an electronic measurement device according to an embodiment.

FIG. 6 shows an electronic measurement device 60 according to an embodiment.

The electronic measurement device 60 can comprise a display 10, in particular the display 10 as shown in FIG. 1 or FIGS. 2a-b.

The numeric value can define a state and/or a setting of the electronic measuring device 10. Changing the numerical value can refer to changing the state or the setting of the electronic measuring device 10 from a first state or setting to a second state or setting. Changing the numerical value comprises setting the new numerical value.

The electronic measurement device 60 can additionally comprise a rotary knob and/or a keyboard to manually change the numerical value.

The electronic measurement device 60 can be an instrument. In particular, the electronic measurement device 60 is any one of the following devices: an audio analyzer, an oscilloscope, a network analyzer, a power meter and/or volt meter, a receiver, a meter and/or counter, a signal and/or spectrum analyzer, a test and/or measurement device for broadcasting, a signal generator, a spectrum monitoring device, a wireless communications tester.

The electronic measurement device 60 can comprise a processing unit and/or a memory that is connectable to the display 10.

The processing unit can be configured to determine the change of a numeric value of the electronic measurement device 60 based on the first user input and/or to determine the resolution and/or the value range for the change of the numerical value based on the second user input.

The processing unit can further be configured to adjust a setting or function of the electronic measurement 60 device based on the change of the numeric value.

The electronic measurement device 60 can further comprise a memory for storing the set respectively changed numerical values in a list.

Figure 7:
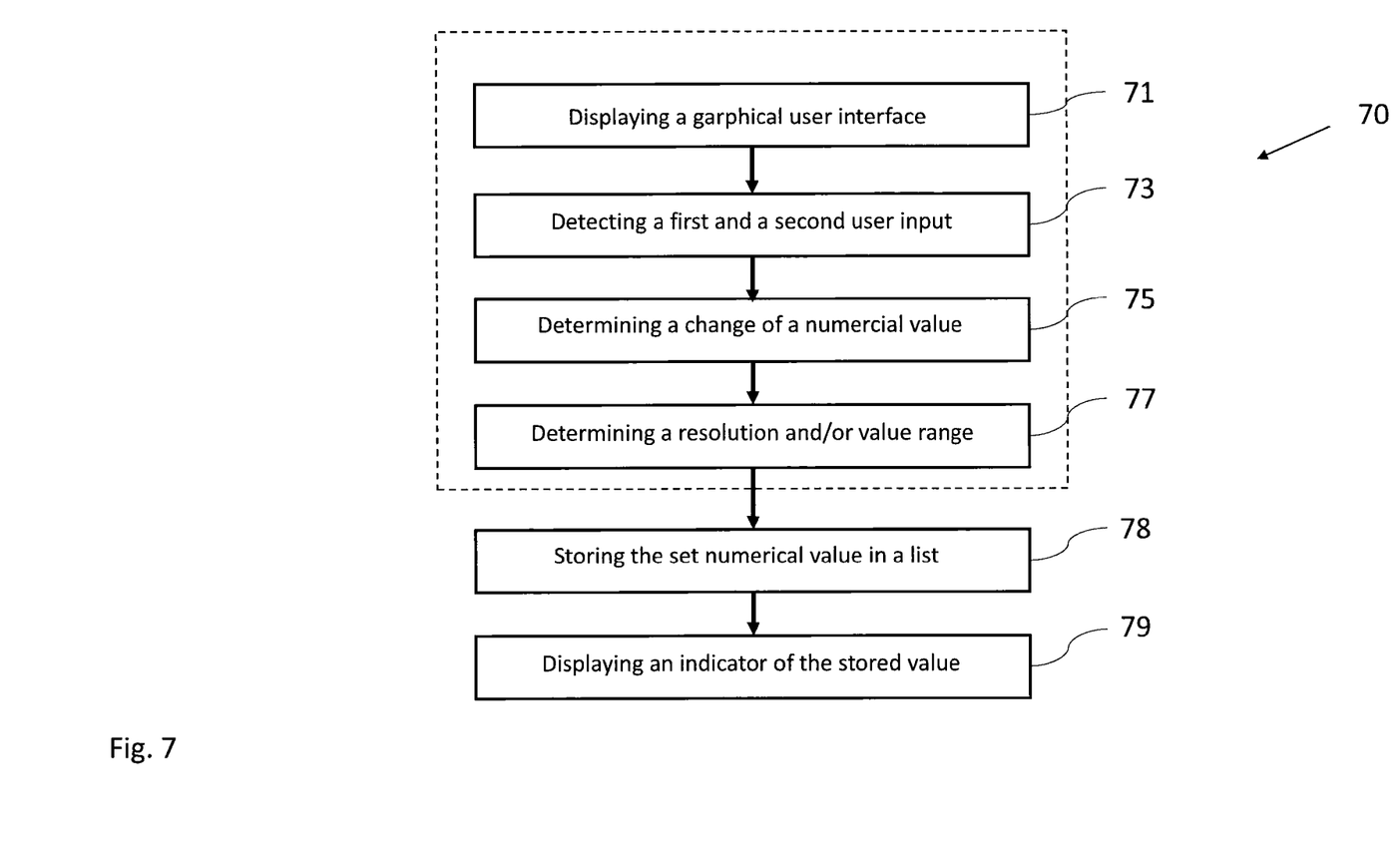
FIG. 7 shows a schematic diagram of a method for changing a numeric value of an electronic measurement device according to an embodiment.

FIG. 7 shows a schematic diagram of a method 70 for changing the numeric value of the electronic measurement 60 device according to an embodiment.

The method 70 comprises the steps of displaying 71 the graphical user interface 11, detecting 73 the first and a second user input on the graphical user interface 11, determining 75 the change of the numeric value of the electronic measurement 60 device based on the first user input, and determining 77 the resolution and/or the value range for the change of the numerical value based on the second user input.

The resolution and/or value range for changing the numerical value can be displayed in the graphical user interface 11.

The value range can be a non-linear range, in particular a logarithmic range.

The method in FIG. 7 comprises the further steps of: storing 78 the set numerical value in a list, and displaying 79 an indicator of the stored numerical value on the value range.

The currently set numerical value of the electronic measurement 60 device can be displayed on the graphical user interface 11, wherein the number of digits of the displayed numerical value depends on the determined resolution.

The first and/or the second user input can comprise a swipe and/or a zoom gesture.

The graphical user interface 11 can comprise a 3D or quasi 3D control element, in particular the ball 17 shown in FIG. 1 or the wheel 31, 33 shown in FIG. 3.

It is important to note that the display 10, the electronic measurement device 60 and the method 70 very closely correspond. Therefore, all of the above said regarding the display 10 is also applicable to the electronic measurement device 60 and the method 70. Everything which is described in the description and/or claimed in the claims and/or drawn in the drawings can be combined.

All features described above or features shown in the figures can be combined with each other in any advantageous manner within the scope of the invention.

While various embodiments of the present invention have been described above, it should be understood that they have been presented by way of example only, and not limitation. Numerous changes to the disclosed embodiments can be made in accordance with the disclosure herein without departing from the spirit or scope of the invention should not be limited by any of the above-described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed:

1. A display for an electronic measurement device,
wherein the display is configured to display a graphical user interface,
wherein the graphical user interface comprises a first scale of selectable numerical values of the electronic measurement device along a first axis, and a second scale of selectable resolutions for the first scale along a second axis, wherein the first axis and the second axis are perpendicular,
wherein the graphical user interface further comprises a 3D control element in the form of an animated ball, wherein the first scale and the second scale are wrapped around the animated ball,
wherein the first scale and the second scale intersect, wherein a currently set numerical value from the selectable numerical values on the first scale is displayed in said intersection of the first scale and the second scale,
wherein the display is configured to detect a first and a second user input on the graphical user interface,
wherein the display is configured to determine the change based on the first user input,
wherein the first user input is a vertical swiping movement over the animated ball, and the second user input is a horizontal swiping movement over the animated ball, wherein the animated ball is animated to rotate in response to the user inputs, wherein the first scale and the second scale are animated to rotate with the animated ball, and
wherein the display is configured to determine a resolution and/or a value range for the change of the numerical value based on the second user input.

2. The display of claim 1, wherein the display is configured to display the resolution and/or value range for changing the numerical value in the graphical user interface.

3. The display of claim 2, wherein the display is configured to display an indicator of the stored numerical value on the value range.

4. The display of claim 1, wherein, after changing the numerical value, the display is configured to store the set numerical value in a list.

5. The display of claim 1, wherein the value range is a non-linear range, in particular a logarithmic range.

6. The display of claim 1, wherein the display is configured to display the currently set numerical value of the electronic measurement device, wherein a number of digits of the displayed numerical value depends on the determined resolution.

7. The display of claim 1, wherein the first and/or the second user input comprise a swipe and/or a zoom gesture.

8. An electronic measurement device comprising the display of claim 1.

9. The electronic measurement device of claim 8, wherein the electronic measurement device is any one of the following devices: an audio analyzer, an oscilloscope, a network analyzer, a power meter and/or volt meter, a receiver, a meter and/or counter, a signal and/or spectrum analyzer, a test and/or measurement device for broadcasting, a signal generator, a spectrum monitoring device, a wireless communications tester.

10. A method for changing a numerical value of an electronic measurement device, comprising the steps of:
displaying a graphical user interface, wherein the graphical user interface comprises a first scale of selectable numerical values of the electronic measurement device along a first axis, and a second scale of selectable resolutions for the first scale along a second axis, wherein the first axis and the second axis are perpendicular,
wherein the graphical user interface further comprises a 3D control element in the form of an animated ball, wherein the first scale and the second scale are wrapped around the animated ball,
wherein the first scale and the second scale intersect, wherein a currently set numerical value from the selectable numerical values on the first scale is displayed in said intersection of the first scale and the second scale,
detecting a first and a second user input on the graphical user interface,
wherein the first user input is a vertical swiping movement over the animated ball, and the second user input is a horizontal swiping movement over the animated ball, wherein the animated ball is animated to rotate in response to the user inputs, wherein the first scale and the second scale are animated to rotate with the animated ball,
determining a change of the numeric value based on the first user input, and
determining a resolution and/or a value range for the change of the numerical value based on the second user input.

11. The method of claim 10, wherein the resolution and/or value range for changing the numerical value is displayed in the graphical user interface.

12. The method of claim 11, comprising the further steps of:
after changing the numerical value, storing the set numerical value in a list, and
displaying an indicator of the stored numerical value on the value range.

13. The method of claim 10, wherein the value range is a non-linear range, in particular a logarithmic range.

14. The method of claim 10, wherein the currently set numerical value of the electronic measurement device is displayed in the graphical user interface, wherein a number of digits of the displayed numerical value depends on the determined resolution.

15. The method of claim 10, wherein the first and/or the second user input comprise a swipe and/or a zoom gesture.

* * * * *